United States Patent
MacGregor et al.

(10) Patent No.: US 7,307,424 B2
(45) Date of Patent: Dec. 11, 2007

(54) ELECTROMAGNETIC SURVEYING FOR HYDROCARBON RESERVOIRS

(75) Inventors: Lucy M. MacGregor, Edinburgh (GB); Martin C. Sinha, Southampton (GB); Richard Weaver, Hampshire (GB)

(73) Assignee: OHM Limited, Southampton, Hamphire (GB)

( * ) Notice: Subject to any disclaimer, the term of this patent is extended or adjusted under 35 U.S.C. 154(b) by 172 days.

(21) Appl. No.: 10/534,783

(22) PCT Filed: Nov. 23, 2003

(86) PCT No.: PCT/GB03/05094

§ 371 (c)(1),
(2), (4) Date: Dec. 15, 2005

(87) PCT Pub. No.: WO2004/049008

PCT Pub. Date: Jun. 10, 2004

(65) Prior Publication Data

US 2006/0132137 A1    Jun. 22, 2006

(30) Foreign Application Priority Data

Nov. 25, 2002 (GB) ................................ 0227451.2

(51) Int. Cl.
    *G01V 3/00* (2006.01)
(52) U.S. Cl. ..................................... 324/337; 324/365
(58) Field of Classification Search ........ 324/323–375; 702/6, 7, 11, 13
See application file for complete search history.

(56) References Cited

U.S. PATENT DOCUMENTS 4,079,309 A *  3/1978  Seeley ......................... 324/345
4,617,518 A    10/1986  Srnka (Continued)

FOREIGN PATENT DOCUMENTS

GB     2382875      6/2003

(Continued)

OTHER PUBLICATIONS

MacGregor et al., Electrical Resistivity Structure of the Valu FA Ridge, Lau Basin, From Marine Controlled-Source Electromagnetic Sounding, 2001, Geophysics J. Int., pp. 217-236.*

(Continued)

*Primary Examiner*—Reena Aurora
*Assistant Examiner*—Kenneth J Whittington
(74) *Attorney, Agent, or Firm*—Renner, Otto, Boisselle & Sklar, LLP

(57) ABSTRACT

An electromagnetic survey method for surveying an area that potentially contains a subterranean hydrocarbon reservoir. The method comprises detecting a detector signal in response to a source electromagnetic signal, resolving the detector signal along at least two orthogonal directions, and comparing phase measurements of the detector signal resolved along these directions to look for a phase separation anomaly indicative of the presence of a buried hydrocarbon layer. The invention also relates to planning a survey using this method, and to analysis of survey data taken using this survey method. The first and second data sets may be obtained concurrently with a single horizontal electric dipole source antenna. The method is also largely independent of a source-detector pair's relative orientation and so provides for good spatial coverage and easy-to-perform surveying.

27 Claims, 10 Drawing Sheets

U.S. PATENT DOCUMENTS 6,163,155 A    12/2000    Bittar

FOREIGN PATENT DOCUMENTS

| WO | 00/13047 | 3/2000 |
|---|---|---|
| WO | 01/20366 | 3/2001 |
| WO | 01/57555 | 8/2001 |
| WO | 02/14906 | 2/2002 |

OTHER PUBLICATIONS

Sinha, et al. "An Active Source Electromagnetic Sounding System for Marine Use." Mar. Geophys. Res., 12, 1990, 59-68.

Evans, et al. "On the electrical nature of the axial melt zone at 13 degrees north on the East Pacific Rise" J. Geophys. Res., 99, 1994, 577-588.

Edwards, et al. "First results of the MOSES experiment: Sea sediment conductivity and thickness determination, Bute Inlet, British Columbia, by magnetometric offshore electrical sounding." Geophyics, 50, 1985, 153-161.

Eidesmo, et al. "See Bed Logging (SBL), a new method for remote and direct identification of hydrocarbon filled layers in deepwater areas." First Break, 20, 2002, 144-152.

Ellingsrud, et al. "Remote sensing of hydrocarbon layers by sea-bed logging (SBL): Results from a cruise offshore Angola." The Leading Edge, Oct. 2002, 972-982.

MacGregor, et al. "Use of marine controlled source electromagnetic sounding for sub-basalt exploration." Geophysical Prospecting, 48, 2000, 1091-1106.

MacGregor, et al. "The RAMESSES experiment III: Controlled source electromagnetic sounding of the Reykjanes Ridge at 57 degrees 45'N." Geophysical Journal International, 135, 1998, 773-789.

Chave, et al. "Controlled electromagnetic sources for measuring electrical conductivity beneath the oceans, 1. Forward problem and model study." J. Geophys. Res., 87, 1982, 5327-5338.

Sinha, Martin C. "Controlled source EM sounding: Survey design considerations for hydrocarbon applications." LITHOS Science Report, Apr. 1999, 1, 95-101.

* cited by examiner

ELECTROMAGNETIC SURVEYING FOR HYDROCARBON RESERVOIRS

This application is a national phase of International Application No. PCT/GB2003/005094 filed Nov. 23, 2003 and published in the English language.

BACKGROUND OF THE INVENTION

The invention relates to seafloor electromagnetic (EM) surveying for oil and other hydrocarbon reserves.

Geophysical methods for mapping subterranean resistivity variations by various forms of EM surveying have been in use for many years [1, 2, 3, 10]. In these methods, electric field detectors are placed on the seafloor at carefully chosen positions at ranges up to about 10 km from an electromagnetic source. Detector signals measured at the detectors are sensitive to variations in subterranean strata configuration resistivity beneath the area being surveyed. However, EM surveying was not widely thought of as a technique that could be applied to finding hydrocarbon reservoirs.

More recently, it was proposed to use EM surveying to find hydrocarbon reservoirs. An early proposal by Statoil was to use the vertical current flow components to detect hydrocarbon layers [4, 5], since it is these components that are sensitive to the presence of a thin resistive layer. This was based on the understanding that a subterranean strata configuration that includes a resistive hydrocarbon layer embedded within less resistive sediments will give rise to a measurable enhancement of the electric field amplitude compared to a subterranean strata configuration comprising only water-bearing sediments. The Statoil proposal was to collect data from detector locations which are in-line with (i.e. end-on to) the axis of a horizontal electric dipole (HED) antenna so that the galvanic mode, that should be most sensitive to the presence of a buried high resistivity layer, dominates. However, it was established that the Statoil method could not provide reliable results, since the in-line data collected is incapable of distinguishing between a thin buried hydrocarbon layer of high resistivity situated in less resistive strata, on the one hand, and a non-hydrocarbon bearing rock formation in which the strata exhibits increasing resistivity with depth, on the other hand, the latter being a common feature of many large scale sedimentary structures.

It was then proposed to use the EM surveying method according to Sinha [12] for finding hydrocarbon reservoirs [9, 13] and it was then confirmed that this method works well in practice for finding hydrocarbon reservoirs [6, 7]. The essence of the Sinha method is to normalise the in-line data with equivalent data for the same source-detector pair locations collected in an orthogonal geometry where the inductive mode dominates the response, referred to as a broadside geometry. In the broadside geometry the axis of the HED dipole antenna of the source is perpendicular to a line between the detector and source. EM surveying of a hydrocarbon reservoir applying the Sinha method is now described in more detail.

Survey data is collected by using a surface vessel to tow a submersible vehicle carrying a HED antenna over a survey area. The HED antenna broadcasts a source electromagnetic signal into the seawater. Detectors are located on the seafloor over the survey area and measure a signal in response to EM fields induced by the HED antenna. The amplitude of the detector signals is sensitive to resistivity variations in the underlying strata configuration and this is used to determine the nature of the subsea structure. In order to successfully map subterranean resistivity variations, the orientation of the current flows induced by the source electromagnetic signal must be considered [6]. The response of seawater and subterranean strata to the source electromagnetic signal is different for horizontally and vertically flowing induced current components. For horizontally flowing current components, the coupling between the layers comprising the subterranean strata is largely inductive. This means the presence of a thin resistive layers (which is indicative of a hydrocarbon layer) does not significantly affect the detector signal at the seafloor since the large scale current flow pattern is not affected by the thin resistive layer. On the other hand, for vertical current flow components, the coupling between layers is largely galvanic (i.e. due to the direct transfer of charge). In these cases even a thin resistive layer strongly affects the detector signals at the seafloor since the large scale current flow pattern is interrupted by the resistive layer.

While it is the vertical components of induced current flow which are most sensitive to the presence of a thin resistive layer, sole reliance on these components for detecting a hydrocarbon layer is not possible without ambiguity. The effects on the amplitude signals at the detectors arising from the presence a thin resistive layer can be indistinguishable from the effects which arise from other realistic large scale subterranean strata configurations. In order to resolve these ambiguities, it is necessary to determine the response of the subterranean strata to both horizontal (i.e. inductively coupled) and vertical (i.e. vertically coupled) induced current flows [6].

An electromagnetic source such as a HED antenna generates both inductive and galvanic current flow modes, with the relative strength of each mode depending on source-detector geometry. At detector locations which are broadside to the HED antenna dipole axis, the inductive mode dominates the response. At detector locations which are in-line with the HED antenna dipole axis, the galvanic mode is stronger [6, 8, 9, 10]. Accordingly, the response of the subterranean strata to vertical induced current flows along a line between a source location and a detector location is determined by arranging the HED antenna to present an end-on orientation to a detector, and the response of the subterranean strata to horizontal induced current flows along the line between the source location and the detector location is determined by arranging the HED antenna to present a broadside orientation to the detector. Data from both geometric configurations is required.

It is therefore important when designing a practical EM survey for detecting buried hydrocarbon layers using known techniques to distinguish between source and detector configurations in which the coupling between layers is largely inductive due to horizontal currents (in which case the survey has little sensitivity to the presence of a thin resistive layer) and those in which the coupling between layers is largely galvanic due to vertical currents (in which case blocking of the passage of this current flow by a reservoir leads to a survey which is strongly sensitive to the presence of a thin resistive layer).

FIG. 1 shows in plan view an example survey geometry according to the Sinha method. There are sixteen detectors 25, and these are laid out in a square grid on a section of seafloor 6 above a subterranean hydrocarbon reservoir 56. The hydrocarbon reservoir 56 has a boundary indicated by a heavy line 58. The orientation of the hydrocarbon reservoir is indicated by the cardinal compass points (marked N, E, S and W for North, East, South and West respectively) indicated in the upper right of the figure. To perform a survey, a source such as a HED antenna, starts from location 'A' and is towed along a path indicated by the broken line 60 through location 'B' until it reaches location 'C', which marks the end of the survey path. As is evident, the tow path first covers four parallel paths aligned with the North-South direction to drive over the four "columns" of the detectors. This portion of the survey path moves from location 'A' to location 'B'. Starting from location 'B', the survey path then covers four paths aligned with the East-West direction which drive over the four "rows" of detectors. Each detector is thus passed over in two orthogonal directions. The survey is completed when the source reaches the location marked 'C'.

During the towing process, each of the detectors 25 presents several different orientation geometries with respect to the source. For example, when the source is directly above the detector position D1 and on the North-South aligned section of the tow path, the detectors at positions D5, D6 and D7 are at different ranges in an end-on position, the detectors at positions D2, D3 and D4 are at different ranges in a broadside position and the detector at positions D8 and D9 are midway between. However, when the source later passes over the detector position D1 when on the East-West aligned section of the tow path, the detectors at positions D5, D6 and D7 are now in a broadside position, and the detectors at position D2, D3 and D4 are in an end-on position. Thus, in the course of a survey, and in conjunction with the positional information of the source, data from the detectors can be used to provide details of the source electromagnetic signal transmission through the subterranean strata for a range of distances and orientations between source and detector. Each orientation provides varying galvanic and inductive contributions to the signal propagation. In this way the continuous towing of the source can provide a survey which samples over the extent of the subterranean reservoir.

The Sinha method has been demonstrated to provide good results in practice. However, it has some limitations.

Firstly, since the two modes cannot be easily separated there will generally be a level of cross-talk between them at a detector and this can lead to ambiguities in the results.

Secondly, in order to obtain survey data from both in-line and broadside geometries, the HED antenna needs to present two different orientations at each source location. This requires the surface vessel to make multiple passes over broadcast locations and can lead to long and complex tow path patterns.

Thirdly, the survey can only provide the best data possible at discrete source locations. This is because of the geometric requirements of a HED antenna survey which dictate that, at any point during the survey, data can only be optimally collected from those detectors to which the HED antenna is arranged either in-line or broadside. At other orientations, separation of the inductively and galvanically coupled signals becomes more difficult, and resulting data are less reliable. For instance, referring to the figure, when the HED antenna is at a point on the tow path directly above the detector marked D1 and on the North-South aligned section of the tow path, in-line data can only be collected from the detectors marked D5, D6 and D7, whilst broadside data can only be collected from the detectors marked D2, D3 and D4. The other detectors (for example those marked D8, D9 and D10) provide only marginally useful information at this point of the survey because of the complex mixing of the galvanically and inductively coupled modes. Furthermore, if, for example, the HED antenna is at the location identified by reference numeral 57 in the figure, which is on a North-South aligned section of the tow path, in-line data can be collected from the detectors marked D3, D8, D9 and D10, but broadside data cannot be collected from any of the detectors. Since both broadside and in-line data are required for optimal analysis, the best data possible with the square detector array shown in the figure can only be collected from points along the tow path where the source is directly above one of the detector locations.

In summary, with the Sinha method, the time during which good quality data can be collected represents only a small fraction of the overall time taken to perform a survey. Furthermore, in addition to the survey being time-inefficient, it is necessary to accurately follow a complex tow path which has to complement the detector layout, and the detectors themselves must also be carefully accurately arranged. The difficulties in controlling both the position and the orientation of a towed source antenna, coupled with this need to accurately follow a particular tow path relative to the detector grid, is one of the major sources of error in surveys of these kind. The disadvantages associated with the survey constraints imposed by the Sinha method are the price to pay for resolving the ambiguities inherent in the Statoil method.

SUMMARY OF THE INVENTION

According to the invention there is provided an electromagnetic survey method for surveying an area that is thought or is known to contain a subterranean hydrocarbon reservoir, comprising: transmitting a source electromagnetic signal from a source location; detecting a detector signal at a detector location in response thereto; and obtaining survey data indicative of phase difference between first and second components of the detector signal resolved along first and second directions respectively.

By comparing phase measurements of different components of the detector signal, a phase separation anomaly can be detected which is sensitive to the presence of a hydrocarbon layer or reservoir within a subterranean strata configuration. The presence or not a phase separation anomaly, and hence the presence or not of a hydrocarbon layer, can be determined with a single source orientation. There is no need, as there is with known methods based on amplitude, for data to be collected with different source orientations. Accordingly, surveys can be performed more quickly and without needing to accurately control the source orientation. Furthermore, because of this insensitivity of a phase measurement to the relative source orientation, reliable data collection is not limited to specific source location and detector location geometries, as is the case when collecting in-line/broadside amplitude data, and a much less complex and geometrically restrained towpath can be employed to survey an extended area.

The first and second components can be any two of radial, vertical and azimuthal. The clearest phase anomaly appears to occur from the pairing of radial and azimuthal components. It is also possible to use all three components together, i.e. to have first, second and third components.

The first, second and, if used, third directions are preferably orthogonal, since by observing geometrically independent components of the detector signals, there is minimal cross-talk between the first and second data sets, and the sensitivity to the presence of a hydrocarbon reservoir is accordingly increased.

The source electromagnetic signal can be broadcast from an antenna mounted on a submersible vehicle, or from a static location, such as within a borehole, or from an oil or gas platform.

The source electromagnetic signal can be emitted at different frequencies to obtain survey data at a plurality of different frequencies. Moreover, the source electromagnetic signal can be emitted at a variety of frequencies, preferably between 0.01 Hz and 10 Hz. The method can be advantageously repeated over the same survey area using different frequencies of source electromagnetic signal. Lower frequencies are generally preferred. By probing the subterranean strata at a number of different frequencies of source electromagnetic signal, it is possible to obtain improved vertical resolution of structures within the subterranean strata configuration.

The source signal can be from a horizontal electric dipole. Such a signal can be provided using existing equipment, and also allows relatively simple inversion modelling.

The invention also provides a method of analysing results from an electromagnetic survey of an area that is thought or known to contain a subterranean hydrocarbon reservoir, comprising: providing survey data indicative of phase difference between first and second components of a detector signal resolved along first and second directions respectively; extracting the phase differences from the survey data; and determining a metric from the phase differences that is predictive of the presence or absence of hydrocarbon.

The phase differences can be extracted by rotationally transforming the survey data from an instrument frame to a source frame.

The invention also provides a computer program product bearing machine readable instructions for implementing the analysis method.

The invention further provides a method of planning an electromagnetic survey of an area that is thought or known to contain a subterranean hydrocarbon reservoir, comprising: creating a model of the area to be surveyed including a seafloor, a rock formation containing a postulated hydrocarbon reservoir beneath the seafloor, and a body of water above the seafloor; setting values for depth below the seafloor of the postulated hydrocarbon reservoir and resistivity structure of the rock formation; and performing a simulation of an electromagnetic survey in the model to obtain from the model phase differences between first and second components of a detector signal resolved along first and second directions respectively.

Repeated simulations for a number of distances between a source and a detector and frequencies can be performed in order to allow optimum surveying conditions in terms of source-to-detector distance and frequency of EM signal for probing the hydrocarbon reservoir to be selected when performing an electromagnetic survey. The effects of differing detectors array configurations and source tow paths can also be modelled.

The invention also provides a computer program product bearing machine readable instructions for implementing the planning method.

BRIEF DESCRIPTION OF THE DRAWINGS

For a better understanding of the invention and to show how the same may be carried into effect reference is now made by way of example to the accompanying drawings in which.

DETAILED DESCRIPTION

A method of electromagnetic surveying for oil and other hydrocarbon reserves is described which does not require separate data acquisition of the response of a subterranean strata configuration to inductively and galvanically coupled modes. The new method can be performed using pre-existing survey equipment.

Figure 2A:
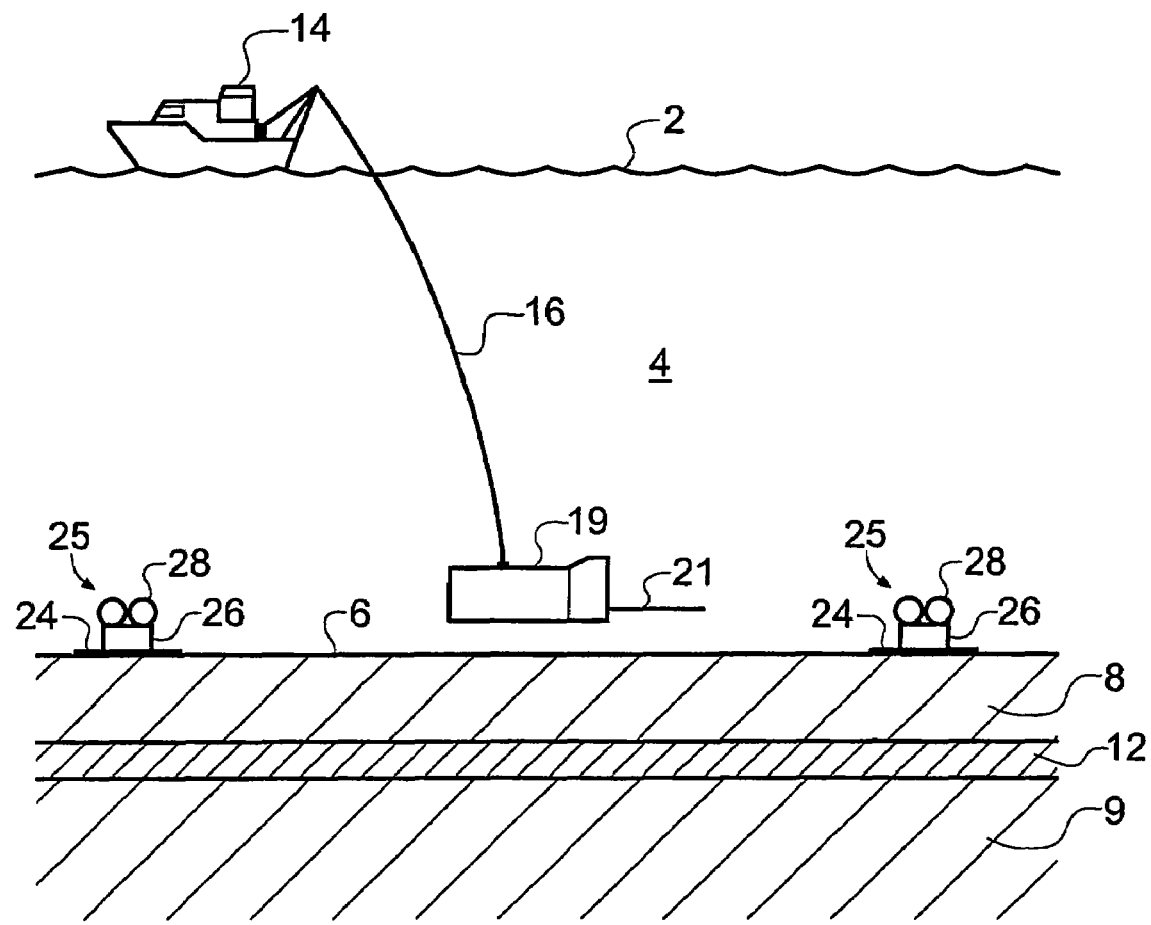
FIG. 2A shows in schematic vertical section a surface vessel undertaking an EM survey.

FIG. 2A schematically shows a surface vessel 14 undertaking EM surveying of a subterranean strata configuration in a way that is suitable for collecting survey data for carrying out the invention. The subterranean strata configuration includes an overburden layer 8, an underburden layer 9 and a hydrocarbon layer (or reservoir) 12. The surface vessel 14 floats on the surface 2 of the seawater 4. A deep-towed submersible vehicle 19 carrying a HED antenna 21 is attached to the surface vessel 14 by an umbilical cable 16 providing an electrical, optical and mechanical connection between the deep-towed submersible vehicle 19 and the surface vessel 14. The HED antenna broadcasts a source electromagnetic signal into the seawater 4.

One or more remote detectors 25 are located on the seafloor 6. Each detector 25 includes an instrument packages 26, a detector antenna 24, a floatation device 28 and a ballast weight (not shown). The detector antenna 24 measures a detector signal in response to EM fields induced by the HED antenna in the vicinity of the detector 25, the amplitude of the detector signals is sensitive to resistivity variations in the underlying strata configuration. The instrument package 26 records the detector signals for later analysis. The detector antenna 24 in this example comprises two orthogonal dipole antennae arranged to detect first and second components of the electric field in a horizontal plane, i.e. one which is parallel to the seafloor 6.

The detectors record two (or three) orthogonal components of the seafloor electric field as raw data. The raw survey data are then analysed, after recovery of the detectors and transfer of the raw data into a suitable computer. Initially a spectral analysis is performed to remove the component of the signal which corresponds to source transmission, as is conventional. The survey data are then combined with source and receiver navigation data, again as is conventional. Then the survey data are processed to rotate the electric fields from an 'instrument' frame (i.e. components parallel to the receiver dipoles of the detector) to the 'source' frame (i.e. radial and azimuthal components referenced to the source-receiver geometry). This is a new processing step specific to the present invention.

Figure 2B:
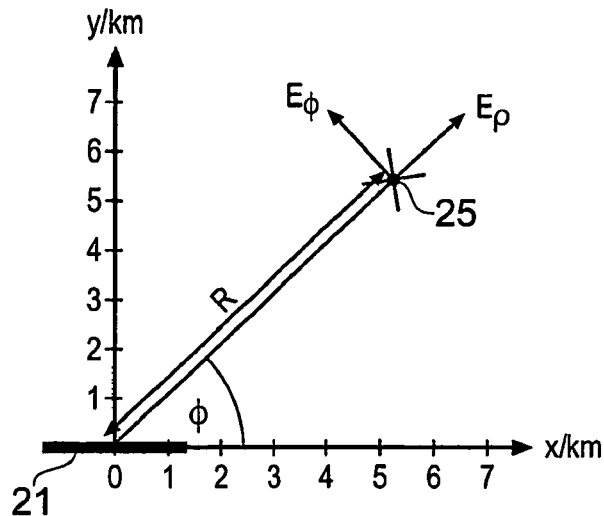
FIG. 2B is a plan view detailing a polar coordinate system.

FIG. 2B is a schematic plan view detailing a polar-coordinate system which is used to describe the principles of the new method. The origin of the coordinate system is positioned at the centre of the HED antenna shown in FIG. 2A, and zero-azimuth is aligned parallel to the dipole axis of the HED antenna, as indicated in FIG. 2B (the HED antenna in this Figure not drawn to scale). In FIG. 2B, a single detector 25 is shown positioned at a range of R km from the origin, and at an azimuth of $\Phi°$. The orthogonal dipole antennae comprising the detector antenna 24 are arbitrarily oriented in the horizontal plane as indicated in the figure.

Since the phase difference from the source of electromagnetic radiation from a horizontal dipole source is an azimuthally symmetric subterranean strata configuration is largely independent of azimuth $\Phi$, phase measurements recorded at the detector antenna 24 are largely independent of the azimuthal position of the detector 25 shown in FIG. 2B. This allows phase data to be collected equally over a wider range of source-detector orientations than is possible with amplitude data, and any inaccuracies in the measurement of the azimuthal position of the detector in the coordinate system shown in FIG. 2B have a lesser effect.

In the following examples, the two components of detected electric field, also known as detector signal, for which the phase is measured are a radial component and an azimuthal component. The radial component is that component of the electric field resolved along a direction parallel to a line connecting the source location and the detector location, and marked $E_\rho$ in FIG. 2B. The azimuthal component is that component of the electric field resolved along a direction perpendicular to a line connecting the source location and the detector location and in a horizontal plane, and marked $E_\Phi$ in FIG. 2B. The components of the detected electric field along these directions is determined from the angular orientation of the orthogonal dipole antennae comprising the detector antenna 24 relative to the line joining the source location and the detector location. This can be easily determined using standard instrumentation, such as, for example, active or passive sonar to determine the relative positions of the source location and the detector location, and a magnetic compass to determine the detector antenna orientation.

In order to show how the respective phases of two spatial components (e.g. radial $\rho$ and azimuthal $\Phi$ components) of the electric field can be used to detect the presence of a subterranean hydrocarbon reservoir, numerical forward modelling of the kind described by Chave and Cox [11] is applied to different model subterranean strata configurations.

Figure 3:
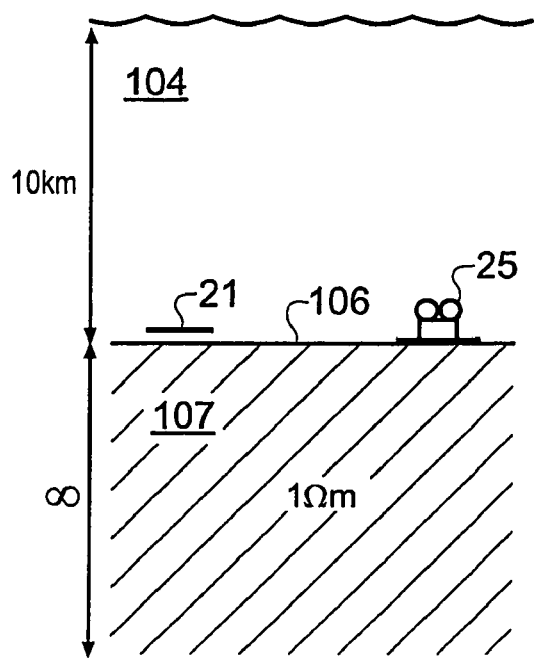
FIG. 3 shows in schematic vertical section a model uniform background subterranean strata configuration.

FIG. 3 shows in schematic vertical section a model background subterranean strata configuration. The configuration comprises a section of seafloor 106 beneath a 10 km depth of seawater 104. The seawater has a resistivity of 0.31 $\Omega$m. Beneath the seafloor 106 is a uniform half-space sedimentary structure with a resistivity of 1 $\Omega$m, the low resistivity being primarily due to aqueous saturation of pore spaces. This background subterranean strata configuration extends uniformly downwards for an infinite extent. Also indicated in FIG. 3 are a HED antenna 21, and a detector 25, such as those shown in FIG. 2A. The distance between the HED antenna and the detector (i.e. the range) is R km. The azimuthal position of the detector relative to the orientation of the HED antenna is arbitrary due to the insensitivity of the phase component of the detected electric field signals to azimuth.

Figure 4:
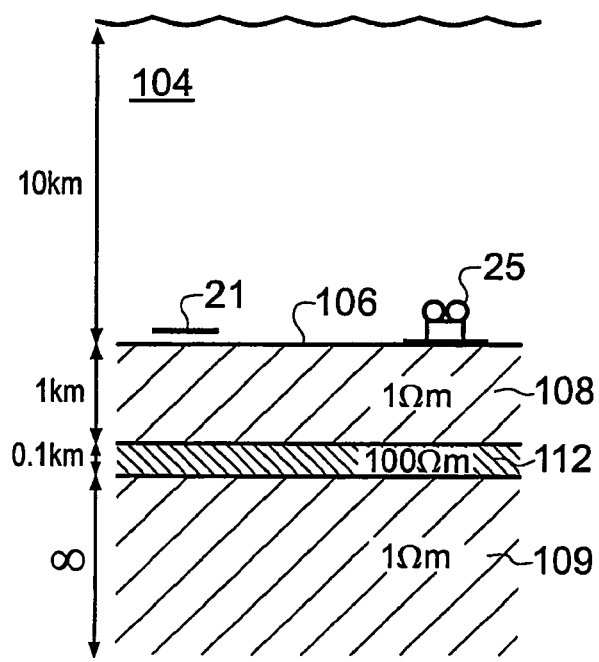
FIG. 4 shows in schematic vertical section a model hydrocarbon-layer subterranean strata configuration.

FIG. 4 shows in schematic vertical section a model hydrocarbon-layer subterranean strata configuration. A section of seafloor 106 lies beneath a 10 km depth of seawater 104 which has a resistivity of 0.31 $\Omega$m. The strata configuration beneath the seafloor 106 comprises a 1 km thick overburden layer 108, representing sediments, arranged above a hydrocarbon layer 112. The overburden layer 108 has a resistivity of 1 Ωm, again, primarily due to aqueous saturation of pore spaces. The hydrocarbon layer 112 is 0.1 km thick, and has a resistivity of 100 Ωm. The relatively high, resistivity of the hydrocarbon layer is due to the presence of non-conducting hydrocarbon within pore spaces. Below the hydrocarbon layer 112 is a sedimentary underburden layer 109, which, as for the overburden layer, has a resistivity of 1 Ωm. The underburden layer extends downwardly for an effectively infinite extent. Accordingly, except for the presence or absence of the hydrocarbon layer 112, the background subterranean strata configuration of FIG. 3 and the hydrocarbon-layer subterranean strata configuration of FIG. 4 are identical. A HED antenna 21 and a detector 25 are again shown as in FIG. 3.

Figure 5A:
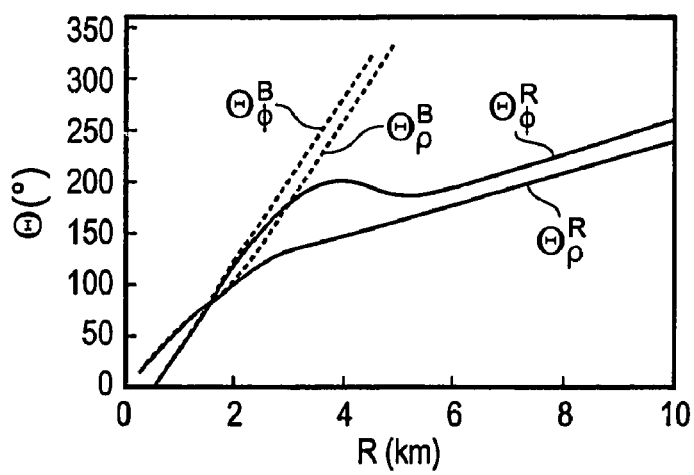
FIG. 5A shows a graph plotting calculations of phases of different components of detector signals seen during a model electromagnetic survey of the subterranean strata configurations shown in FIGS. 3 and 4.

FIG. 5A shows a graph plotting the modelled phase θ of the radial and azimuthal components of the detected electric field for both the background subterranean strata configuration and the hydrocarbon-layer subterranean strata configuration models shown in FIGS. 3 and 4 respectively as a function of range R. The phase is measured relative to a source electromagnetic signal transmitted by the HED antenna 21. In this example, the source electromagnetic signal is at a frequency of 0.5 Hz. The radial and azimuthal components of the detected electric field for the background subterranean strata configuration are marked $\theta_\rho^B$ and $\theta_\Phi^B$ respectively and the corresponding components of the detected electric field for the hydrocarbon-layer subterranean strata configuration are marked $\theta_\rho^R$ and $\theta_\Phi^R$ respectively. The results show that $\theta_\rho^B$, $\theta_\Phi^B$, $\theta_\rho^R$ and $\theta_\Phi^R$ all advance steadily in phase with increasing range R. However, it is also clear that the rate of phase advance is less for the hydrocarbon-layer subterranean strata configuration than for the background subterranean strata configuration. In the case of the background subterranean strata configuration, the phase of both the radial and azimuthal components advances at a rate of around 90° per km. In addition, at ranges beyond about 2 km, the azimuthal component $\theta_\Phi^B$ consistently lags the radial component $\theta_{92}^B$ by around 25°. In the hydrocarbon-layer subterranean strata configuration, however, the behaviour is somewhat different. Beyond around 5 km, the azimuthal component $\theta_{101}^R$ again lags the radial component $\theta_\rho^R$ by around 25°, however the phase of both components advances at a rate of around only 10° per km. This is significantly lower than that seen with the background subterranean strata configuration. Furthermore, at ranges between around 2 km and 5 km, the difference in phase between azimuthal component $\theta_\Phi^B$ and the radial component $\theta_\rho^R$ varies significantly. A phase separation anomaly is seen which varies from close to 0° phase difference between the radial and azimuthal components of detected electric field to a maximum of almost 60°.

Figure 5B:
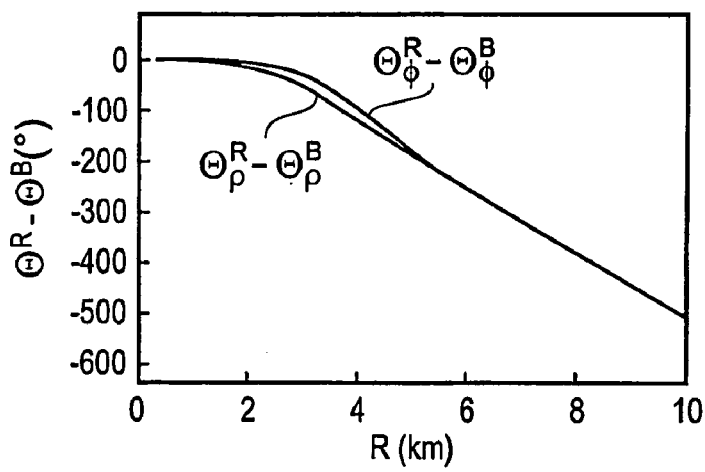
FIG. 5B shows a graph plotting differences in the phases shown in FIG. 5A.

FIG. 5B shows a graph plotting, for both the radial and azimuthal components, the difference in phase $\theta^R - \theta^B$ between the hydrocarbon-layer and background subterranean strata configurations as a function of range R. The difference in the radial components is marked $\theta_\rho^R - \theta_\rho^B$, and the difference in azimuthal components is marked $\theta_\Phi^R - \theta_{101}^R$. The different rates of phase advancement seen with the hydrocarbon-layer and background subterranean strata configurations is apparent in the negative gradient of the curves beyond around 3 km. The differing behaviour at mid ranges (between around 2 km and 5 km) is apparent from the separation of the curves over this range.

These differences in phase behaviour, namely the relatively slow advancement in phase of both radial and azimuthal components when a reservoir is present, and the strong range-limited variation in phase between the radial and azimuthal components seen at mid-ranges when the reservoir is present, provide two useful characteristics with which to determine the presence or absence of a hydrocarbon layer within an otherwise uniform background.

For the practical application of controlled source electromagnetic surveying to hydrocarbon exploration, it is necessary that other common subterranean strata configurations do not lead to a behaviour similar to that seen in the hydrocarbon-layer subterranean strata configuration model. In particular, it is important to be able to distinguish between subterranean strata configurations which include a thin hydrocarbon layer and non-hydrocarbon containing subterranean strata configurations that have increasing resistivity with depth.

Figure 6:
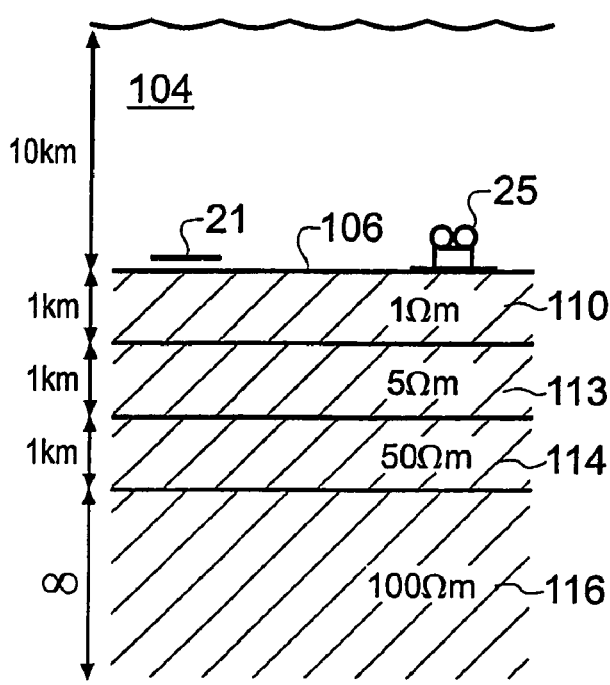
FIG. 6 shows in schematic vertical section a model of a non-hydrocarbon bearing subterranean strata configuration.

FIG. 6 shows in vertical section a highly schematic model of a non-hydrocarbon containing subterranean strata configuration. This subterranean strata configuration exhibits increasing resistivity with depth, which is a common feature of many large scale sedimentary structures. Due, for example, to increasing expulsion of conducting seawater with depth from rising overburden pressure. As with the background and hydrocarbon-layer subterranean strata configurations described above, in the non-hydrocarbon bearing subterranean strata configuration a section of seafloor 106 lies beneath a 10 km depth of seawater 104. The strata beneath the seafloor 106 comprise a series of sedimentary layers of increasing resistivity. A first layer 110 has a uniform resistivity of 1 Ωm and a thickness of 1 km. A second layer 113 has a uniform resistivity of 5 Ωm and a thickness of 1 km. A third layer 114 has a uniform resistivity of 50 Ωm and a thickness of 1 km. Beneath the third layer 114 is a fourth layer 116 which has a resistivity of 100 Ωm and extends downwardly for an infinite extent. A HED antenna 21 and a detector 25 are again shown as in FIG. 3.

Figure 7:
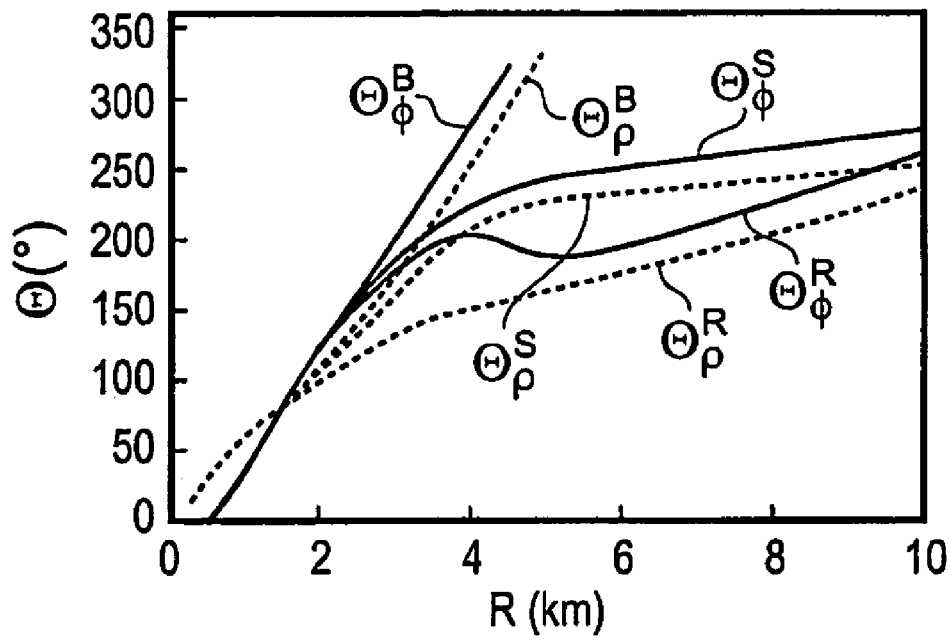
FIG. 7 shows a graph plotting calculations of phases of different components of detector signals seen during a model electromagnetic survey of the subterranean strata configurations shown in FIGS. 3, 4 and 7.

FIG. 7 shows a graph which is similar to and will be understood from the description of FIG. 5A above, but which also includes modelled curves determined for the non-hydrocarbon bearing subterranean strata configuration. The modelled curves marked $\theta_\rho^B$, $\theta_\Phi^B$, $\theta_\rho^R$, and $\theta_\Phi^R$ are the same as those shown in FIG. 5A. The curves marked $\theta_\rho^S$ and $\theta_\Phi^S$ show the radial and azimuthal components of the detected electromagnetic field seen with the non-hydrocarbon bearing subterranean strata configuration.

The behaviour of the variation in phase of the detected electric field as a function of range beyond around 5 km is broadly similar for the hydrocarbon-layer subterranean strata configuration and the non-hydrocarbon bearing subterranean strata configuration. There are moderate differences in gradient between the models for the example shown, and in some circumstances this may allow the two subterranean strata configurations to be distinguished. (In other examples, the gradients are almost the same.) However, even if measurable, the value of the gradient is likely to be a fairly unreliable indicator of subterranean strata configuration in practice. This is because different absolute values of resistivity, for instance a more or less resistive hydrocarbon layer in the hydrocarbon-layer subterranean strata configuration, or a more rapidly increasing resistivity with depth in a non-hydrocarbon bearing subterranean strata configuration, are likely to lead to changes in the observed gradients and cause confusion between the two models.

However, at ranges between around 2 km and 5 km, there is nothing in the phase of the detected electric fields in response to the non-hydrocarbon bearing subterranean strata configuration which resembles the phase separation anomaly seen with the hydrocarbon-layer subterranean strata configuration. The phase behaviour seen with the non-hydrocarbon bearing subterranean strata configuration much more closely resembles that of the background subterranean strata configuration across this range. Accordingly, it is the phase separation anomaly (and not the gradient) which provides the most appropriate indicator of subterranean strata configuration.

Figure 8:
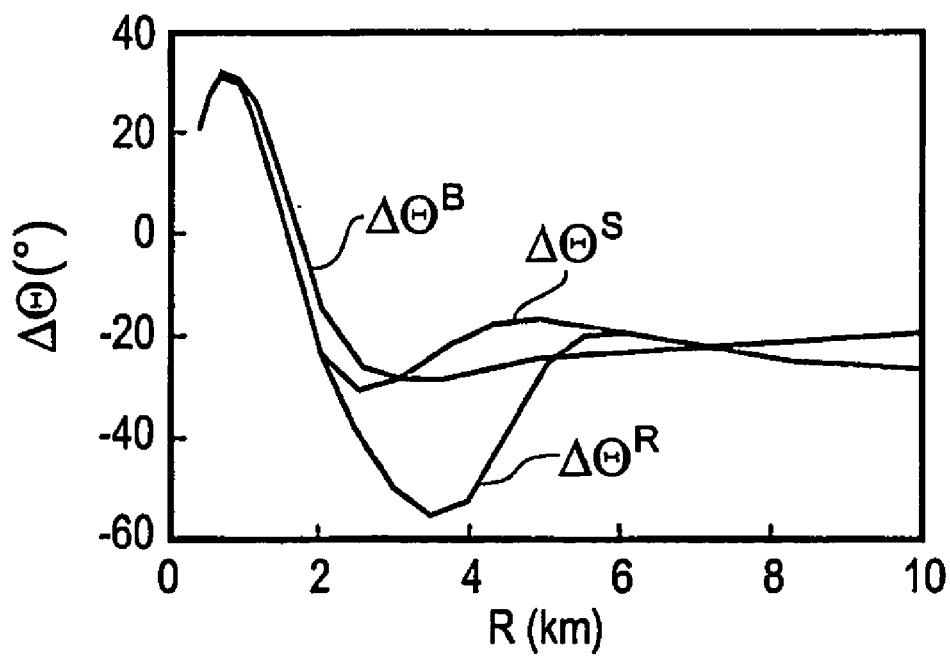
FIG. 8 shows a graph plotting differences in the phases shown in FIG. 7.

FIG. 8 shows a graph plotting the difference in the phase $\Delta\theta$ between the radial and azimuthal components of the detected electric field for the three model subterranean strata configurations described above as function of range R. The curve marked $\Delta\theta^B$ in FIG. 8 represents the difference between the curves marked $\theta_\Phi^B$ and $\theta_\rho^B$ in FIG. 7 (with negative values corresponding to the azimuthal component lagging the radial component). The curves marked $\Delta\theta^R$ and $\Delta\theta^S$ in FIG. 8 correspondingly represent the differences between the curves marked $\theta_\Phi^R$ and $\theta_\rho^R$, and $\theta_\Phi^S$ and $\theta_\rho^S$ in FIG. 7 respectively.

The phase separation anomaly seen with the hydrocarbon-layer subterranean strata configuration (curve marked $\Delta\theta^R$ in FIG. 8) is apparent as a clear trough centred at a range of around 3.5 km. The magnitude of the phase separation anomaly at this point is almost 60°. This difference in phase between the radial and azimuthal components of the detected electric field is about 30° more negative than the largest difference seen with either the background or the non-hydrocarbon bearing subterranean strata configurations. With current technology, a phase differences between the radial and azimuthal components of the detected electric field of 10° can be clearly resolved. Accordingly, the presence or not of a trough similar to that seen in FIG. 8 is easily detectable, and able to distinguish between a hydrocarbon-layer subterranean strata configuration of the type shown in FIG. 3, and the model subterranean strata configurations shown in FIGS. 4 and 6.

By distributing a linear array of detectors along a section of seafloor, and at each one recording suitable raw data in response to a source electromagnetic signal broadcast by a horizontal electromagnetic dipole source, plots such as those shown in FIG. 8 can be generated from the phase information obtained from the raw data. The results of these plots can then be used to indicate the type subterranean strata configuration beneath a line joining the source and the detectors. Unlike previous survey methods, this can be done using a single dipole source and without the need to collect multiple data sets corresponding to different orientations of the source.

By distributing a planar array of detectors on a section of seafloor, and at each one recording raw data in response to a source electromagnetic signal broadcast by a horizontal electromagnetic dipole source, plots such as those shown in FIG. 8 can be generated for a number of different directions once the phase information has been extracted from the raw data. Because of the insensitivity of phase to the azimuthal position of a detector with respect to the source dipole axis, the plots along each of the different directions achievable with a planar array of detectors can be obtained simultaneously, irrespective of the dipole source orientation. This allows a thorough two- or three-dimensional survey to be performed without even having to move the source. This contrasts to previous methods where a relatively long and complicated tow of the dipole source is required to utilise all of the detectors in a planar array, and then only with relatively low spatial sampling. Whilst all of the detectors in a planar array can be utilised without moving the source, in practical surveys employing the new method, it is likely that the source will nonetheless be moved, such as shown in FIG. 2A. Each new source position provides an entire set of useful source-detector geometries, and so provides more comprehensive sampling of the subterranean strata configuration for a given number of detectors. In addition, by moving the source, surveys can be fully performed where the detectors are deployed over an area with a characteristic scale larger than the range of distances over which phase measurements can be reliably used to indicate the presence of a hydrocarbon layer.

Figure 1:
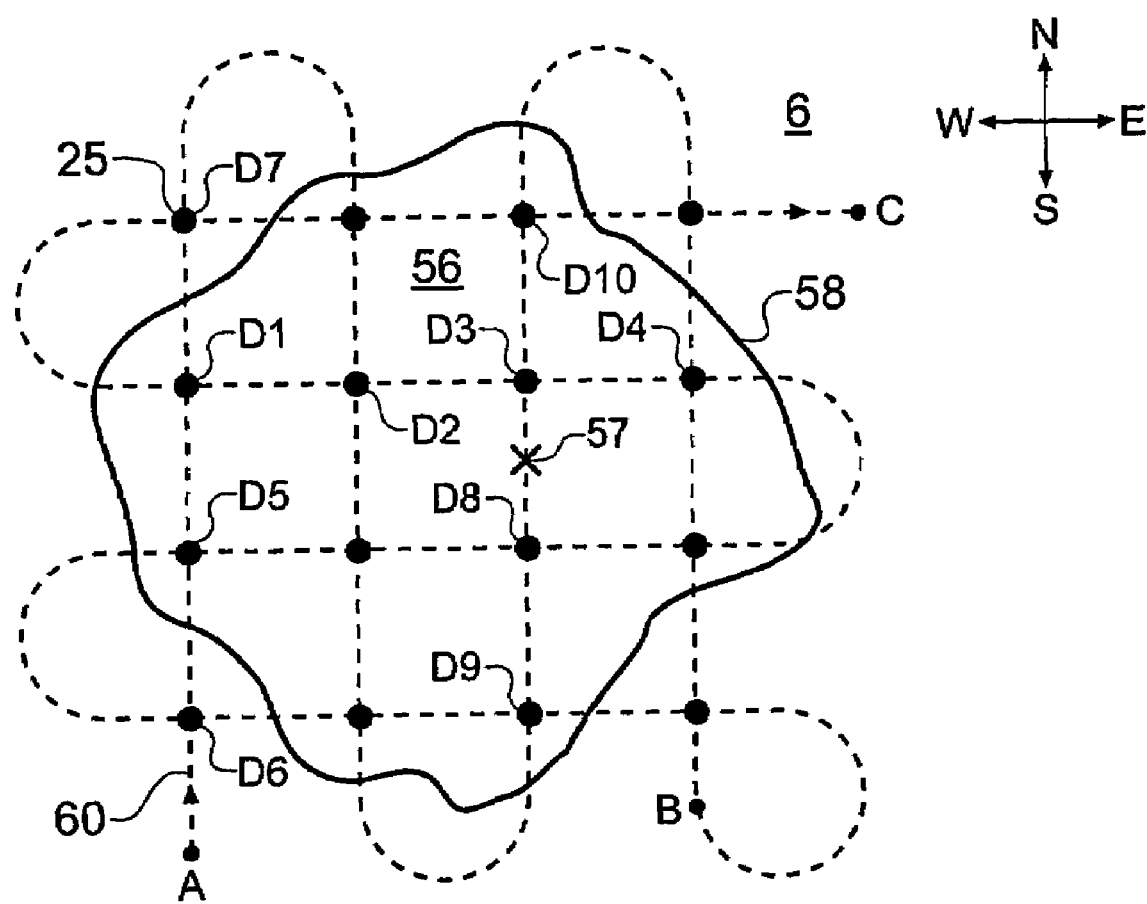
FIG. 1 is a schematic plan view showing an example survey geometry following prior art principles in which sixteen detectors are laid out on a section of seafloor above a subterranean reservoir.
Figure 9A:
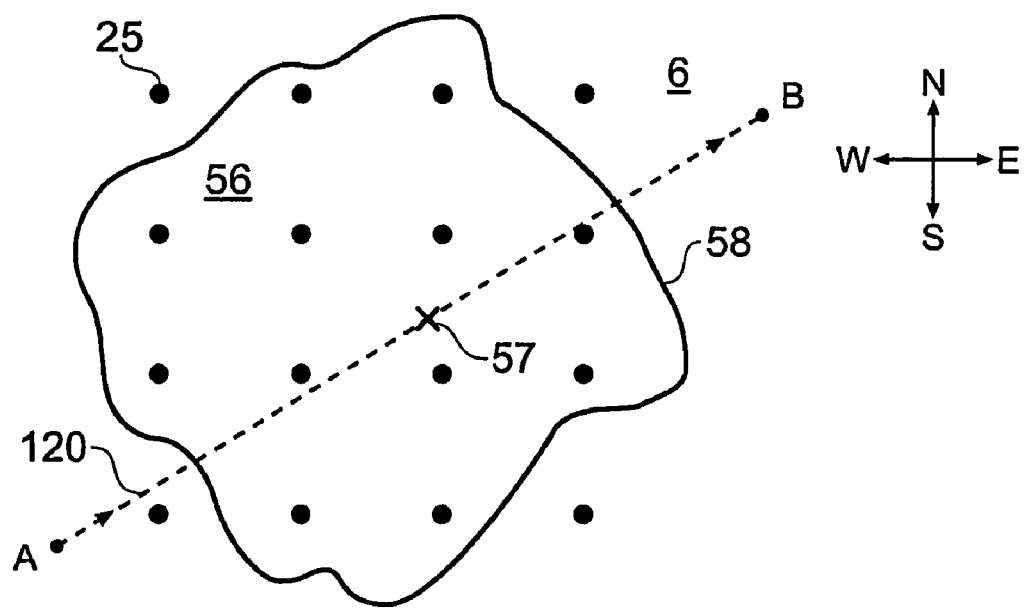
FIG. 9A is a schematic plan view showing an example survey geometry according to an embodiment of the present invention in which sixteen detectors are laid out on a section of seafloor above a subterranean reservoir.

FIG. 9A shows in plan view an area of seafloor 6 to be surveyed and which is similar to that shown in the prior art FIG. 1. There are sixteen detectors 25 for recording the phase components described above. The detector are laid out in a square grid above a subterranean reservoir 56. Other detector distributions could be used instead, such as other grid shapes, or distributions that are not in a simple grid. (The constraints on detector placement patterns imposed by the amplitude-based methods of both Statoil and Sinha are therefore lifted.) The subterranean reservoir 56 has a boundary indicated by a heavy line 58. The orientation of the subterranean reservoir is indicated by the cardinal compass points (marked N, E, S and W for North, East, South and West respectively) indicated in the upper right of the figure. To perform a survey using an embodiment of the new method, a source starts from location 'A' and is towed along a path indicated by the broken line 120 to location 'B', which marks the end of the survey path. At most points along the tow path, useful data can be collected from all of the detectors. For example, when the source antenna is at the location marked by the reference numeral 57 in FIG. 9A, all sixteen of the detectors 25 are able to collect reliable data. This contrasts to the correspondingly similar location shown in FIG. 1, again marked by the reference numeral 57, at which point no useful data can be collected using previous methods. Accordingly, the tow path shown in FIG. 9A, which is startlingly simple compared to that shown in FIG. 1, actually provides a much greater amount of valid data. As noted above, with the new method, it is only necessary to know the relative positions of the source and detectors, and the orientation of each detector antenna such that the radial and azimuthal components of the detected electric field can be geometrically resolved. Since the orientation of the antenna is not critical, there is no need for the tow path 120 shown in FIG. 9A to closely follow a pattern defined by the grid of detectors. In fact, it is preferable for the tow path to not align too closely with the north-south and east-west based detector grid, since for detectors in an end-on position (i.e. at an azimuth of 0° in the coordinate system shown in FIG. 2B), the amplitude of the azimuthal component of the detected electric field will be small for a dipole source, and the phase of this component more difficult to accurately establish. In source-detector orientations where either the radial or azimuthal components of the detected electric field are small, other components of the detected electric field may be employed, for instance as described further below.

Figure 9B:
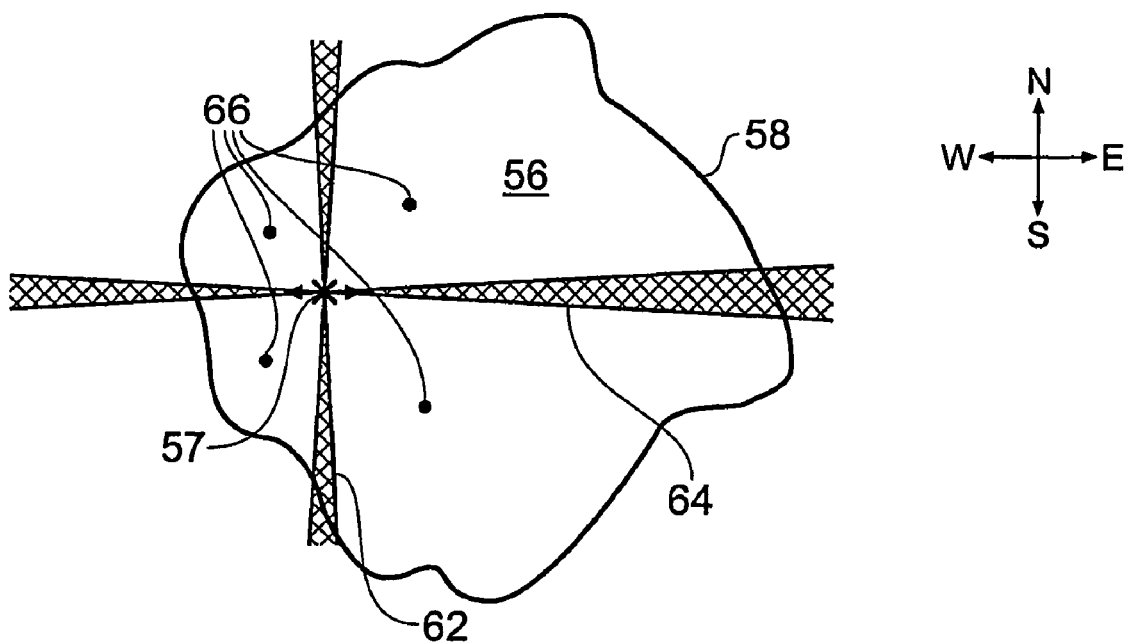
FIG. 9B compares the signal coverage of the prior art method and the method of the invention.

FIG. 9B is a graphical representation comparing the signal spread of the new phase method to the old inline/broadside amplitude method. The example reservoir 56 bounded by the perimeter 58 is shown. The dipole source is at an arbitrary location 57 within the reservoir with the HED antenna axis aligned W-E. In the old method, good quality inline amplitude data is only collectable within a narrow angular range 64 indicated by W-E dark shading in the figure, and good quality broadside amplitude data is only collectable within a narrow angular range 62 indicated by the N-S dark shading in the figure. The angular ranges 62 and 64 need to be narrow to ensure that one of the inductive and galvanic signal components dominates over the other. Data collected by detectors in the four main quadrants 66 is essentially bad data to be rejected from analysis. On the other hand, in the new method, the situation is reversed. The broad quadrants 66 become the regions over which good quality data is collected, since they are the regions in which phase can be fully decomposed into the radial and azimuthal signal components needed for the phase-difference anomaly measurement, whereas the dark areas 62, 64 are angular areas where the collected data becomes unreliable since the magnitude of one of the radial and azimuthal signal components is likely to become too small causing signal-to-noise problems.

The modelled phase responses shown in FIGS. 5A, 5B, 7 and 8 were all calculated for a horizontal electromagnetic dipole source transmitting a source electromagnetic signal at a frequency of 0.5 Hz.

Figure 10:
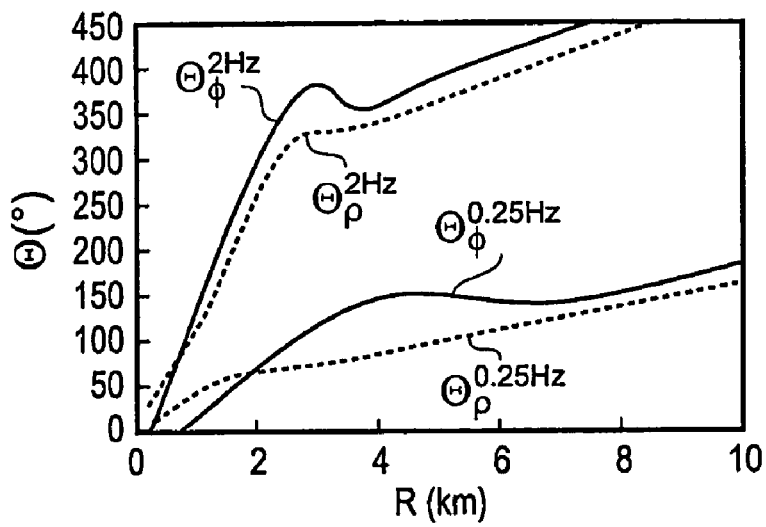
FIG. 10 shows a graph plotting calculations of phases of different components of detector signals seen during a model electromagnetic survey of the subterranean strata configurations shown in FIG. 4 at two different source electromagnetic signal frequencies.

FIG. 10 shows a graph plotting the modelled phase $\theta$ of the radial and azimuthal components of the detected electric field for the hydrocarbon-layer subterranean strata configuration model shown in FIG. 3 as a function of R for two different frequencies of source electromagnetic signal. The modelled radial and azimuthal components of the detected electric field seen in response to a dipole source transmitting at a frequency of 2 Hz are marked $\theta_\rho^{2Hz}$ and $\theta_\Phi^{2Hz}$ respectively, and the modelled radial and azimuthal components of the detected electric field seen in response to a dipole source transmitting at a frequency of 0.25 Hz are marked $\theta_\rho^{0.25Hz}$ and $\theta_\Phi^{0.25Hz}$ respectively. These curves, and also comparison with the modelled radial and azimuthal components of the detected electric field seen in response to a dipole source transmitting at a frequency of 0.5 Hz, marked $\theta_\rho^R$ and $\theta_\Phi^R$ in FIG. 5A, indicate a frequency dependence to the characteristics of the phase separation anomaly indicative of a buried hydrocarbon layer. Towards higher frequencies, the phases of the radial and azimuthal components advance faster than at lower frequencies, and the scale over which the phase separation anomaly characteristic of a hydrocarbon layer's presence occurs is also seen to be frequency dependent.

Figure 11A:
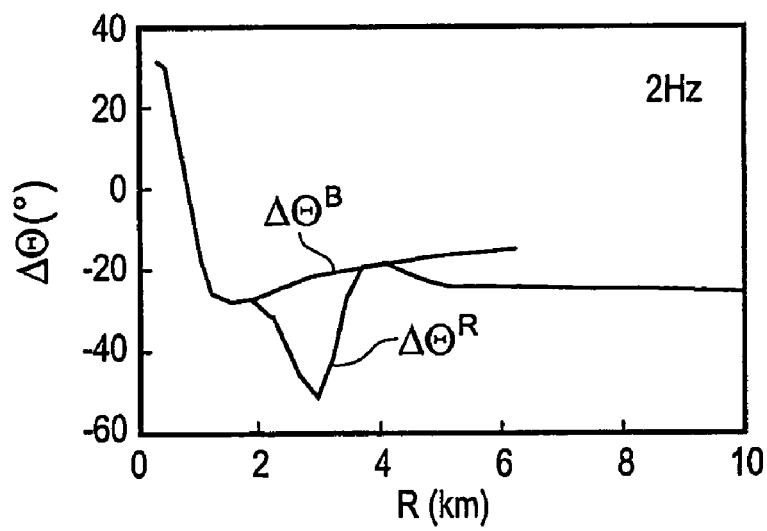
FIGS. 11A and 11B show graphs plotting differences in the phases shown in FIG. 10.

FIG. 11A shows a graph plotting the difference in the phase $\Delta\theta$ between the radial and azimuthal components of the detected electric field for the reservoir and background model subterranean strata configurations described above as function of range R, in response to a dipole source transmitting at a frequency of 2 Hz. The curve marked $\Delta\theta^R$ in FIG. 11A represents the difference between the curves marked $\theta_\Phi^{2Hz}$ and $\theta_\rho^{2Hz}$ in FIG. 10 (with positive values corresponding to the radial component lagging the azimuthal component). The curve marked $\Delta\theta^B$ represents the corresponding data for the background model subterranean strata configuration.

Figure 11B:
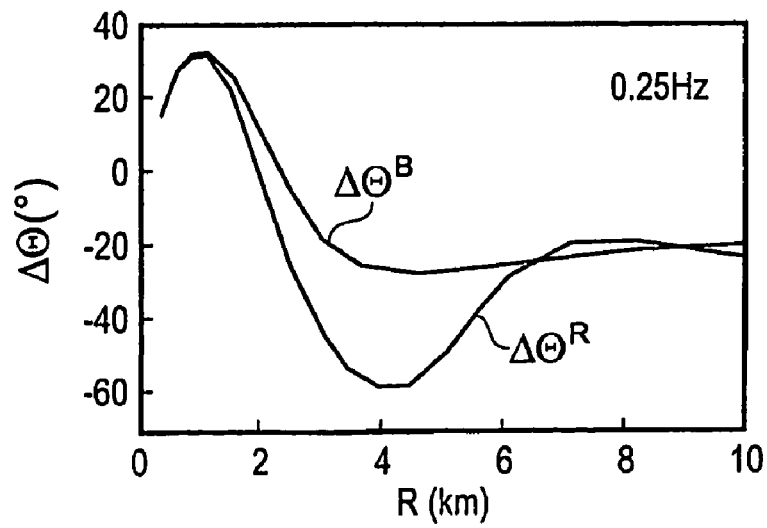

FIG. 11B is shows a graph plotting the difference in the phase $\Delta\theta$ between the radial and azimuthal components of the detected electric field for the reservoir and background model subterranean strata configurations described above as function of range R, in response to a dipole source transmitting at a frequency of 0.25 Hz. The curve marked $\Delta\theta^R$ in FIG. 11B represents the difference between the curves marked $\theta_\Phi^{0.25Hz}$ and $\theta_\rho^{0.25Hz}$ in FIG. 10 (with positive values corresponding to the radial component lagging the azimuthal component). The curve marked $\Delta\theta^B$ represents the corresponding data for the background model subterranean strata configuration.

It is clear from FIGS. 8, 11A and 11B, that the range over which the phase separation anomaly occurs is smaller at higher frequencies. At 2 Hz (see FIG. 11A), the phase separation anomaly is centred at a range of around 3 km and occurs over a characteristic range of about 1 km. At 0.5 Hz (see FIG. 8), the phase separation anomaly is centred at a range of around 3 km and occurs over a characteristic range of about 2 km. At 0.25 Hz (see FIG. 11B), the phase separation anomaly is centred at a range of around 3 km and occurs over a characteristic range of about 3 km. For all frequencies, the maximum phase separation seen with the hydrocarbon-layer subterranean strata configuration is about 30° more negative than the phase difference that would be seen if the hydrocarbon layer were not present. This indicates that the presence of a hydrocarbon layer can be detected using a range of frequencies, each of which acts a probe of the subterranean strata configuration operating over a slightly different spatial scale.

Figure 12A:
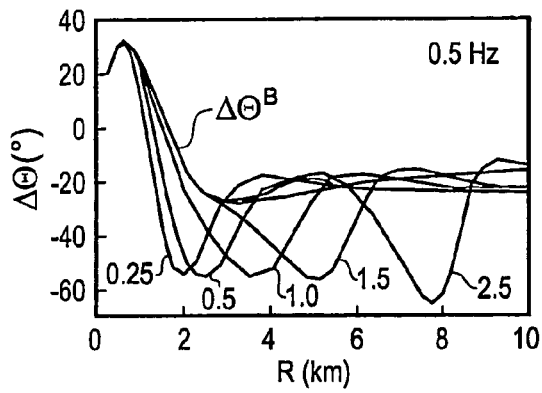
FIG. 12A shows a graph plotting calculations of differences in phases between different components of detector signals seen during a model electromagnetic survey of several hydrocarbon-layer subterranean strata configurations with an electromagnetic source signal frequency of 0.5 Hz.

FIG. 12A is a graph showing the effect of differing overburden thicknesses. The graph plots the difference in the phase $\Delta\theta$ between the radial and azimuthal components of the detected electric field for several hydrocarbon-layer subterranean strata configurations with different overburden thicknesses as function of range R. In this example, the source electromagnetic signal is at a frequency 0.5 Hz. Curves are plotted for different hydrocarbon-layer subterranean strata configurations which, while otherwise similar to the hydrocarbon-layer subterranean strata configuration shown in FIG. 4, have overburden thicknesses of 0.25 km, 0.5 km, 1.0 km, 1.5 km and 2.5 km. The curves corresponding to each different overburden thickness are correspondingly marked in the figure. The curve marked 1.0 in FIG. 12A is identical to the curve marked $\Delta\theta^R$ in FIG. 8 since the overburden thickness in the model shown in FIG. 3 (and used for the modelling shown in FIG. 8) is 1.0 km. The curve marked $\Delta\theta^B$ in FIG. 12A is similar to and will be understood from the similarly marked curve in FIG. 8. For each of the curves corresponding to different overburden thicknesses, the magnitude of the phase separation anomaly is roughly similar, varying from about 55° with an overburden thickness of 0.25 km to about 65° with an overburden thickness of 2.5 km. Accordingly, the method is equally able to detect a thin hydrocarbon layer at a range of depths beneath the sea floor. It is also apparent that the range at which the phase separation anomaly is maximum increases with increasing overburden thickness. This sensitivity of the range of maximum phase separation anomaly to overburden thickness can allow the depth of a reservoir to be determined with appropriate inversion modelling and suitable data coverage.

Figure 12B:
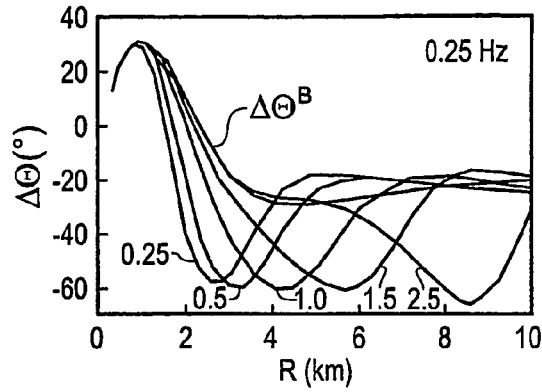
FIG. 12B shows a graph plotting calculations of differences in phases between different components of detector signals seen during a model electromagnetic survey of several hydrocarbon-layer subterranean strata configurations with an electromagnetic source signal frequency of 0.25 Hz.
Figure 12C:
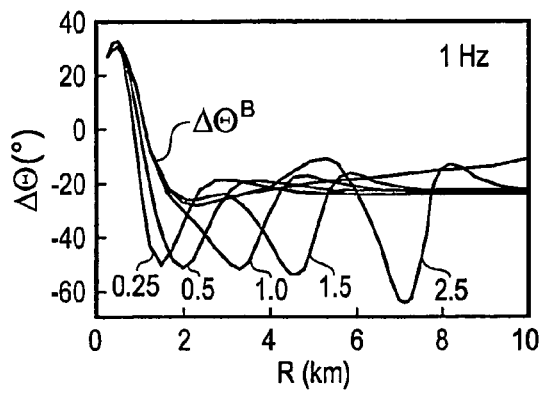
FIG. 12C shows a graph plotting calculations of differences in phases between different components of detector signals seen during a model electromagnetic survey of several hydrocarbon-layer subterranean strata configurations with an electromagnetic source signal frequency of 1.0 Hz.
Figure 12D:
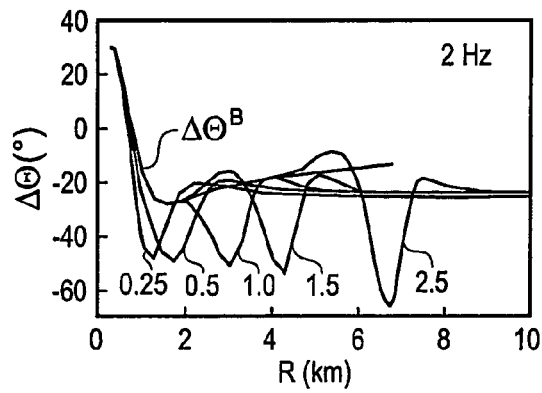
FIG. 12D shows a graph plotting calculations of differences in phases between different components of detector signals seen during a model electromagnetic survey of several hydrocarbon-layer subterranean strata configurations with an electromagnetic source signal frequency of 2.0 Hz.

FIGS. 12B, 12C and 12D are similar to and will be understood from FIG. 12A. However, FIGS. 12B, 12C and 12D show the response of different overburden thicknesses to different frequencies of source electromagnetic signal. FIG. 12B shows the response to a source electromagnetic signal at a frequency 0.25 Hz, FIG. 12C shows the response to a source electromagnetic signal at a frequency 1.0 Hz, FIG. 12B shows the response to a source electromagnetic signal at a frequency 2 Hz. It can be seen that the phase separation anomaly is detectable with a range of frequencies over a range of overburden thicknesses. The magnitude of the phase separation anomaly is broadly similar at each of the different frequencies shown. As seen previously, the range over which the phase separation is apparent narrows with increasing frequency.

Figure 13A:
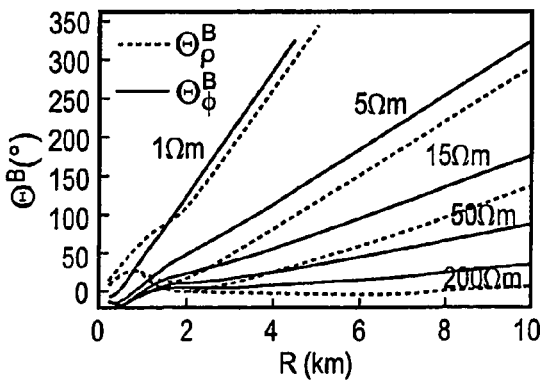
FIG. 13A shows a graph plotting calculations of phases of different components of detector signals seen during a model electromagnetic survey of several uniform background subterranean strata configurations.

FIG. 13A is a graph showing the effect of differing background resistivity. The graph plots the modelled phase $\theta$ of the radial and azimuthal components of the detected electric field for a background subterranean strata configuration similar to that shown in FIG. 3, but with different resistivity values for the uniform subterranean strata, as a function of range R. In this example, the source electromagnetic signal is at a frequency 0.5 Hz. The phase of the radial and azimuthal components of the detected electric field are calculated for resistivity values of 1 Ωm, 5 Ωm, 15 Ωm, 50 Ωm and 200 Ωm, as marked in the figure. For each resistivity value the phase of the radial component of the detected electromagnetic field is shown as a dashed line, and the phase of the azimuthal component is shown as a solid line. The pair of curves corresponding to the 1 Ωm resistivity value are identical to the curves marked $\theta_\rho^B$ and $\theta_\Phi^B$ in FIG. 5A. It is clear that the resistivity value for the subterranean strata in a uniform model containing no hydrocarbon reservoir has a significant effect on the detected phase. The rate of advancement of phase with range, for both the radial and azimuthal components of the detected electric field, falls with increasing background resistivity. For example, at a resistivity of around 15 Ωm, the rate of phase advancement with range is about 15° per km. This is similar to the rate of phase advancement seen with the reservoir subterranean strata configuration model and plotted in FIG. 5A for ranges beyond around 5 km. This again demonstrates how absolute values of phase for each of the radial and azimuthal components can be an unreliable indicator of the likely presence of a hydrocarbon layer within an otherwise uniform resistivity background.

Figure 13B:
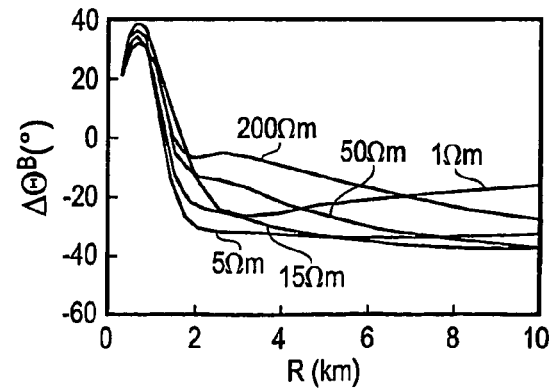
FIG. 13B shows a graph plotting differences in the phases shown in FIG. 13A.

FIG. 13B shows a graph plotting the difference in phase $\Delta\theta$ between the radial and azimuthal components of the detected electric field for each of the different resistivity value background subterranean strata configurations shown in FIG. 13A. Each curve is appropriately marked according to the resistivity value of the model to which it corresponds. The curve marked 1 Ωm is identical to the curve marked $\Delta\theta^B$ in FIG. 8. While the characteristic difference in phase for the radial and azimuthal components is depends on the resistivity of the uniform subterranean strata, none of the curves shown in FIG. 13B display a range limited phase separation anomaly which, as seen in FIG. 8, is indicative of the presence of a buried hydrocarbon layer. It is the resistivity contrast between a buried hydrocarbon layer and an otherwise uniform background which gives rise to the phase separation anomaly. Accordingly, by forming the phase difference between the radial and azimuthal components of the detected electric field in the manner described above, a hydrocarbon-layer containing subterranean strata configuration remains clearly distinguishable from a range of uniform subterranean strata configurations of differing resistivities.

Figure 14:
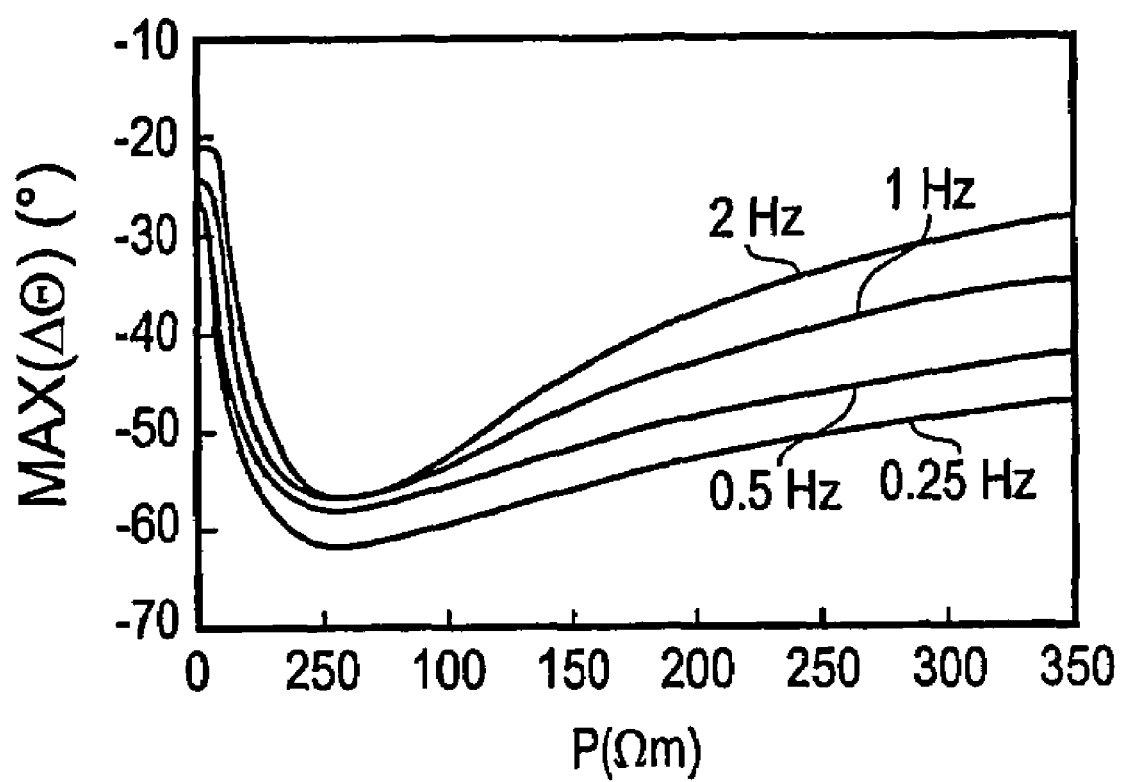
FIG. 14 shows a graph plotting calculations of maximum observed differences in phases between different components of detector signals seen during a model electromagnetic survey of a hydrocarbon-layer subterranean strata configuration, as a function of hydrocarbon-layer resistivity, and for several electromagnetic source frequencies.

FIG. 14 is a graph showing the effect of hydrocarbon-layer resistivities. The graph plots the largest difference in phase max($\Delta\theta$) between the radial and azimuthal components of the detected electric field as a function of differing hydrocarbon-layer resistivity P, in a hydrocarbon-layer subterranean strata configuration which is otherwise similar to that shown in FIG. 3. Curves are shown for source electromagnetic signal frequencies of 0.25 Hz, 0.5 Hz, 1 Hz and 2 Hz, as indicated in the figure. For example, with a source electromagnetic signal frequency of 0.5 Hz, and a hydrocarbon-layer resistivity of 100 Ωm, the largest difference in phase between the radial and azimuthal components of the detected electric field is about −58°. This particular value corresponds to the minimum seen in FIG. 8 for the curve marked $\Delta\theta^R$. Typical hydrocarbon-layer resistivities are between a few tens of Ωm and a few hundreds of Ωm. It can be seen from FIG. 14 that for all typical values of hydrocarbon-layer resistivity, a difference in phase between the radial and azimuthal components of the detected electric field of at least 30° is seen for all source electromagnetic signal frequencies. At lower frequencies, it is even higher.

This demonstrates that the above described method is able to detect hydrocarbon layers with different resistivities, and using a range of source electromagnetic signal frequencies.

It can also be seen from FIG. 14 that the maximum phase difference between the radial and azimuthal components of the detected field is greatest for a hydrocarbon layer with a resistivity of about 50 Ωm. At resistivities above and below this value, a decreasing maximum phase difference is seen.

It has thus been demonstrated that the presence of a hydrocarbon layer in a subterranean strata configuration can be detected by observing the phase difference between radial and azimuthal components of detected electric field in response to a source electromagnetic signal from a horizontal electric dipole source. This has been shown to work over a wide range of source frequencies, for differing depths of burial of a hydrocarbon layer and for different subterranean strata configuration resistivity values.

Alternative Embodiments

Whilst in the above examples the radial and azimuthal components have been considered, similar techniques can also be employed using different components of the detected electromagnetic field. For instance, if the detectors 25 shown in FIG. 2 were configured to also record the phase of the vertical component of the detected electric field (i.e. perpendicular to both the radial and azimuthal directions), the vertical component could be used in combination with another component to probe a subterranean strata configuration.

Figure 15A:
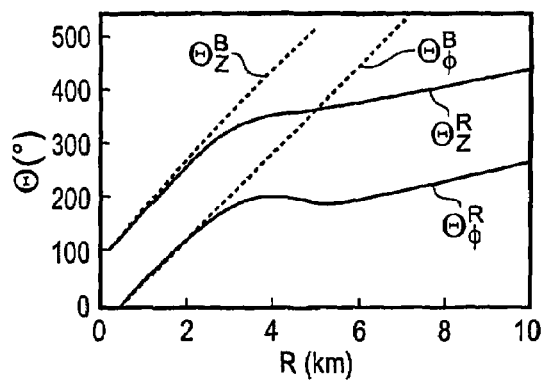
FIG. 15A shows a graph plotting calculations of phases of different components of detector signals seen during a model electromagnetic survey of the subterranean strata configurations shown in FIGS. 3 and 4.

FIG. 15A shows a graph plotting the modelled phase θ of the vertical and azimuthal components of the detected electric field for both the background subterranean strata configuration and the hydrocarbon layer subterranean strata configuration models shown in FIGS. 3 and 4 respectively as a function of R. The phase is measured relative to a source electromagnetic signal transmitted by the HED antenna. In this example, the source electromagnetic signal is at a frequency 0.5 Hz. The vertical and azimuthal components of the detected electric field for the background subterranean strata configuration are marked $\theta_z^B$ and $\theta_\Phi^B$ respectively and the corresponding components of the detected electric field for the hydrocarbon-layer subterranean strata configuration are marked $\theta_z^R$ and $\theta_\Phi^R$ respectively. Except for showing the vertical rather than the radial components of the detected electric field, this figure directly corresponds to FIG. 5A.

Figure 15B:
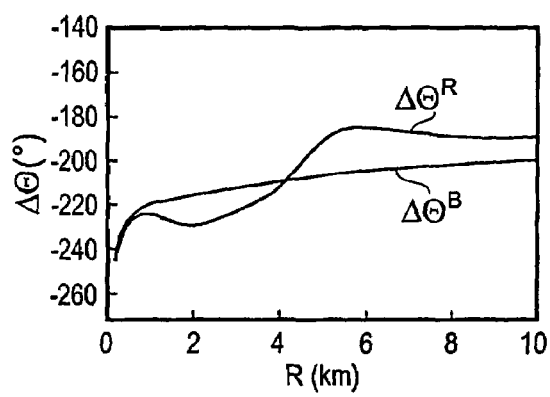
FIG. 15B shows a graph plotting differences in the phases shown in FIG. 15A.

FIG. 15B shows a graph plotting the difference in the phase $\Delta\theta$ between the vertical and azimuthal components of the detected electric field for the two model subterranean strata configurations included in FIG. 15A. The curve marked $\Delta\theta^B$ in FIG. 15B represents the difference between the curves marked $\theta_\Phi^B$ and $\theta_z^B$ in FIG. 15A (with negative values corresponding to the vertical component lagging the azimuthal component). The curve marked $\Delta\theta^R$ FIG. 15B correspondingly represents the difference between the curves marked $\theta_\Phi^R$ and $\theta_z^R$ in FIG. 15A.

Figure 16A:
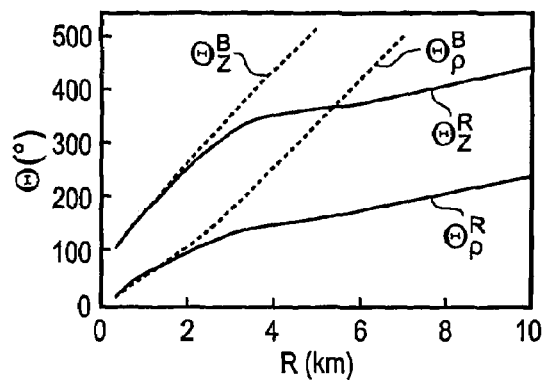
FIG. 16A shows a graph plotting calculations of phases of different components of detector signals seen during a model electromagnetic survey of the subterranean strata configurations shown in FIGS. 3 and 4.

FIG. 16A shows a graph plotting the modelled phase θ of the vertical and radial components of the detected electric field for both the background subterranean strata configuration and the hydrocarbon-layer subterranean strata configuration models shown in FIGS. 3 and 4 respectively. The phase is measured relative to a source electromagnetic signal transmitted by the HED antenna. In this example, the source electromagnetic signal is at a frequency 0.5 Hz. The vertical and radial components of the detected electric field for the background subterranean strata configuration are marked $\theta_z^B$ and $\theta_\rho^B$ respectively and the corresponding components of the detected electric field for the hydrocarbon-layer subterranean strata configuration are marked $\theta_z^R$ and $\theta_\rho^R$ respectively. Except for showing the vertical rather than the azimuthal components of the detected electric field, this figure directly corresponds to FIG. 5A.

Figure 16B:
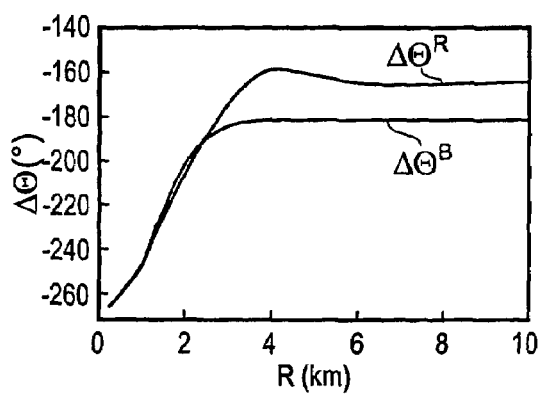
FIG. 16B shows a graph plotting differences in the phases shown in FIG. 16A.

FIG. 16B shows a graph plotting the difference in the phase $\Delta\theta$ between the vertical and radial components of the detected electric field for the two model subterranean strata configurations included in FIG. 16A. The curve marked $\Delta\theta^B$ in FIG. 16B represents the difference between the curves marked $\theta_\rho^B$ and $\theta_z^B$ in FIG. 16A (with negative values corresponding to the vertical component lagging the radial component). The curve marked $\Delta\theta^R$ FIG. 16B correspondingly represents the difference between the curves marked $\theta_\rho^R$ and $\theta_z^R$ in FIG. 16A.

FIGS. 15B and 16B both indicate that the difference in phase between the vertical component of detected electric field and either of the azimuthal or radial components is also sensitive to the presence of a hydrocarbon layer in an otherwise uniform background subterranean strata configuration. The phase difference seen between the vertical and azimuthal components displays both a negative and a positive lobe compared to the background subterranean strata configuration with a crossover at a range of around 4 km. This would be particularly useful indicator for use in survey areas where background resistivity is poorly constrained. The qualitative behaviour of the phase of the vertical component of the detected electric field is approximately similar to that of the azimuthal component. However, a larger phase separation is seen when comparing the radial component with the azimuthal component than when comparing the radial component with the vertical component. Accordingly, the azimuthal component will generally be preferred when comparison is made with the radial component, unless, for instance, the magnitude of the azimuthal component is small, for example, where a detector is very close to an end-on orientation.

In the above description, and in FIGS. 5A, 7, 10, 13A, 15A and 15B, the absolute phase of various components of the detected electric field has been considered relative to the source electromagnetic signal phase. However, in practice, since it is the relative between different components of the detected electric field seen at the detector which is indicative of the presence of a hydrocarbon layer, the detected components may be directly compared without reference to the phase of the source electromagnetic signal.

Finally it will be understood that the invention is equally applicable to surveying of freshwater, for example large lakes, so that references to seafloor, seawater etc. should not be regarded as limiting.

SUMMARY

It has been demonstrated how a phase separation anomaly occurs in response to a hydrocarbon layer which is not seen with a background subterranean strata configuration. This allows the detection of subterranean hydrocarbon reservoirs and hydrocarbon bearing layers. The technique has many advantages over previous methods, for example:

Previous techniques based on comparison of amplitude measurements require the collection of both end-on and broadside data for each receiver to be reliable. This requires multiple orthogonal survey tow paths (see FIG. 1). Using a technique such as described above, a survey may be completed more thoroughly with a much shorter and less complex tow path (see FIG. 9A).

The orthogonal towpaths required by previous methods lead to sampling of different parts of a target structure. Because only single source-receiver pairs are required for a phase-based detection of the reservoir, there is reduced interpretational ambiguity arising from the dimensionality of the target structure. This overcomes the limitation of the prior art Sinha method in which in-line data from a given receiver will come from one source position and the corresponding broadside data at the same range will generally come from a different source location. This means that the structure sampled between the source and detector for the compared in-line and broadside data will not be the same. With the new method, this problem does not arise, since all the data is collected from a single source position, so both phase components in the processed signal are derived from sampling the same structure.

The above described technique is almost independent of detector azimuth relative to a source's dipole axis. Since the method is less dependent on the orientation of the source, geometry-related errors are much reduced. In order to decompose the detector signals into radial and azimuthal (or whichever components are desired) it is only necessary to know the relative positions of the source and detectors, and the orientation of the detector antenna. These can be easily determined using existing technology.

The phase separation seen above is range limited and can be controlled by varying the frequency of the electromagnetic source. If the source were to broadcast at several discrete frequencies (either by employing multiple source antenna or a tuned source for example) improved vertical resolution can be achieved.

For a particular source dipole transmission frequency, the range dependence of phase separation can be used to indicate the depth to the resistive layer.

Phase data are relatively insensitive to structures which are local to the receiver.

REFERENCES

[1] Sinha, M. C., Patel, P. D., Unsworth, M. J., Owen, T. R. E. & MacCormack, M. R. G. An active source electromagnetic sounding system for marine use. *Mar. Geophys. Res.,* 12, 1990, 59-68.

[2] Evans, R. L., Sinha, M. C., Constable, S. C. & Unsworth, M. J. On the electrical nature of the axial melt zone at 13° N on the East Pacific Rise. *J. Geophys. Res.,* 99, 1994, 577-588

[3] Edwards, R. N., Law, K. L., Wolfgram, P. A., Nobes, D. C., Bone, M. N., Trigg, D. F. & DeLaurier, J. M., First result of the MOSES experiment: Sea sediment conductivity and thickness determination, Bute Inlet, Columbia, bu magnetometric offshore electrical sounding, *Geophyics,* 50, 1985, 153-161

[4] WO 00/13046 A1

[5] WO 01/57555 A1

[6] Eidesmo, T., Ellingsrud, S., MacGregor, L. M., Constable, S., Sinha, M. C., Johansen, S, Kong, F-N & Westerdahl, H., Sea Bed Logging (SBL), a new method for remote and direct identification of hydrocarbon filled layers in deepwater areas, *First Break,* 20, 2002, 144-152.

[7] Ellingsrud, S., Sinha, M. C, Constable, S., MacGregor, L. M., Eidesmo, T. & Johansen, S., Remote sensing of hydrocarbon layers by sea-bed logging (SBL): Results from a cruise offshore Angola, *The Leading Edge,* submitted 2002.

[8] MacGregor, L. M. & Sinha, M. C. Use of marine controlled source electromagnetic sounding for sub-basalt exploration. *Geophysical Prospecting,* 48, 2000, 1091-1106.

[9] WO 02/14906 A1

[10] MacGregor, L. M., Constable, S. C. & Sinha, M. C. The RAMESSES experiment III: Controlled source electromagnetic sounding of the Reykjanes Ridge at 57° 45' N. *Geophysical Journal International,* 135, 1998, 773-789.

[11] Chave, A. D. & Cox, C. S., Controlled electromagnetic sources for measuring electrical conductivity beneath the oceans, 1. Forward problem and model study. *J. Geophys. Res.,* 87, 1982, 5327-5338

[12] Martin C. Sinha, "Controlled source EM sounding: Survey design considerations for hydrocarbon applications", *LITHOS Science Report April* 1999, 1, 95-101

[13] GB 2382875 A

The invention claimed is:

1. An electromagnetic survey method for surveying an area that is thought or is known to contain a subterranean hydrocarbon reservoir, comprising:
    transmitting a source electromagnetic signal from a source location;
    detecting a detector signal at a detector location in response thereto;
    obtaining survey data indicative of phase difference between first and second components of the detector signal resolved along different first and second directions respectively; and
    forming the phase difference between the first and second components to determine the presence or absence of a subterranean hydrocarbon formation.

2. The survey method of claim 1, wherein the first and second components are radial and azimuthal with reference to the source location-receiver location geometry.

3. The survey method of claim 1, wherein the first and second components are vertical and azimuthal with reference to the source location-receiver location geometry.

4. The survey method of claim 1, wherein the first and second components are vertical and radial with reference to the source location-receiver location geometry.

5. The survey method of claim 1, further comprising obtaining survey data indicative of phase of a third component of the detector signal resolved along a third direction orthogonal to the first and second directions.

6. The survey method of claim 5, wherein the first and second and third components are vertical, radial and azimuthal with reference to the source location-receiver location geometry.

7. The survey method of claim 1, wherein the first and second directions are orthogonal.

8. The survey method of claim 1, wherein the source electromagnetic signal is broadcast from an antenna mounted on a submersible vehicle which is towed over the survey area to move the source location.

9. The survey method of claim 1, wherein the source location is fixed.

10. The survey method of claim 1, wherein the source electromagnetic signal is emitted at different frequencies to obtain survey data at a plurality of different frequencies.

11. The survey method of claim 1, wherein the source electromagnetic signal is emitted at a frequency of between 0.01 Hz and 10 Hz.

12. A method of analysing results from an electromagnetic survey of an area that is thought or known to contain a subterranean hydrocarbon reservoir, comprising:
    providing survey data indicative of phase difference between first and second components of a detector signal resolved along different first and second directions respectively;
    extracting the phase differences from the survey data; and
    determining a metric from the phase differences to determine the presence or absence of hydrocarbon.

13. The analysis method of claim 12, wherein the first and second components are radial and azimuthal with reference to the source location-receiver location geometry.

14. The analysis method of claim 12, wherein the first and second components are vertical and azimuthal with reference to the source location-receiver location geometry.

15. The analysis method of claim 12, wherein the first and second components are vertical and radial with reference to the source location-receiver location geometry.

16. The analysis method of claim 12, further comprising obtaining survey data indicative of phase of a third component of the detector signal resolved along a third direction orthogonal to the first and second directions.

17. The analysis method of claim 16, wherein the first and second and third components are vertical, radial and azimuthal with reference to the source location-receiver location geometry.

18. The analysis method of claim 12, wherein the first and second directions are orthogonal.

19. The analysis method of claim 18, wherein the phase differences are extracted by rotationally transforming the survey data from an instrument frame to a source frame.

20. A computer program product comprising a machine readable medium bearing machine-executable instructions for implementing the method of claim 12.

21. A method of planning an electromagnetic survey of an area that is thought or known to contain a subterranean hydrocarbon reservoir, comprising:
    creating a model of the area to be surveyed including a seafloor, a rock formation containing a postulated hydrocarbon reservoir beneath the seafloor, and a body of water above the seafloor;
    setting values for depth below the seafloor of the postulated hydrocarbon reservoir and resistivity structure of the rock formation;
    performing a simulation of an electromagnetic survey in the model; and obtaining from the model phase differences between first and second components of a detector signal resolved along different first and second directions respectively.

22. The planning method of claim 21, wherein the first and second components are two of radial, vertical and azimuthal with reference to the source location-receiver location geometry.

23. The planning method of claim 21, further comprising: repeating the simulation for a number of distances between a source and a detector and frequencies in order to select optimum surveying conditions in terms of source-to-detector distance for probing the hydrocarbon reservoir.

24. A computer program product comprising a machine readable medium bearing machine-executable instructions for implementing the planning method of claim 21.

25. A method for obtaining hydrocarbon from an area that contains a subterranean hydrocarbon reservoir; comprising:
    performing an electromagnetic survey of the area to obtain survey data indicative of phase differences between first and second components of a detector signal resolved along different first and second directions respectively;

determining a metric from the phase differences that is predictive of the presence or absence of hydrocarbon;

identifying the subterranean hydrocarbon reservoir using the metric;

penetrating the subterranean hydrocarbon reservoir with a hydrocarbon-producing well;

extracting hydrocarbon from the subterranean reservoir using the hydrocarbon-producing well.

26. A method for obtaining hydrocarbon from an area that contains a subterranean hydrocarbon reservoir, comprising:

extracting hydrocarbon from the subterranean hydrocarbon reservoir, the subterranean hydrocarbon reservoir having been determined to contain hydrocarbon by means of an electromagnetic survey comprising the steps of:

performing an electromagnetic survey of the area to obtain survey, data indicative of the phase differences between first and second components of a detector signal resolved along different first and second directions respectively;

determining a metric from the phase differences that is predictive of the presence or absence of hydrocarbon; and identifying the subterranean hydrocarbon reservoir using the metric.

27. A method according to claim 26, wherein the extracting step includes penetrating the subterranean hydrocarbon reservoir with a hydrocarbon-producing well.

* * * * *